(12) United States Patent
Izumi et al.

(10) Patent No.: US 9,073,789 B2
(45) Date of Patent: Jul. 7, 2015

(54) SINTERED CERAMIC BODY, MANUFACTURING METHOD THEREOF, AND CERAMIC STRUCTURE

(71) Applicant: NGK Insulators, Ltd., Nagoya (JP)

(72) Inventors: Yunie Izumi, Toyota (JP); Yoshimasa Kobayashi, Nagoya (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 112 days.

(21) Appl. No.: 14/023,671

(22) Filed: Sep. 11, 2013

(65) Prior Publication Data

US 2014/0021662 A1     Jan. 23, 2014

Related U.S. Application Data

(62) Division of application No. 12/193,107, filed on Oct. 27, 2010, now Pat. No. 8,603,625.

(30) Foreign Application Priority Data

Nov. 18, 2009  (JP) ................................. 2009-262817
Apr. 27, 2010  (JP) ................................. 2010-102567

(51) Int. Cl.
C04B 35/18       (2006.01)
C04B 35/16       (2006.01)
C04B 35/195      (2006.01)

(52) U.S. Cl.
CPC .......... *C04B 35/18* (2013.01); *Y10T 428/12597* (2015.01); *Y10T 428/257* (2015.01); *C04B 35/16* (2013.01); *C04B 35/195* (2013.01)

(58) Field of Classification Search
CPC ...... C04B 35/16; C04B 35/18; C04B 35/195; C04B 2235/3436
USPC ........................................................ 264/681
See application file for complete search history.

(56) References Cited

U.S. PATENT DOCUMENTS

| | | | | |
|---|---|---|---|---|
| 3,018,168 A | * | 1/1962 | Scarlett et al. | 423/161 |
| 5,137,848 A | * | 8/1992 | Barker et al. | 501/18 |
| 5,858,893 A | * | 1/1999 | Yamamoto et al. | 501/32 |
| 6,080,693 A | | 6/2000 | Maeda et al. | |
| 6,764,746 B2 | * | 7/2004 | Oobuchi et al. | 428/209 |
| 2001/0041657 A1 | | 11/2001 | Abe et al. | |
| 2002/0024160 A1 | | 2/2002 | Sugimoto | |

(Continued)

FOREIGN PATENT DOCUMENTS

| | | |
|---|---|---|
| EP | 1 041 051 A2 | 10/2000 |
| JP | 10-236868 A1 | 9/1998 |

(Continued)

*Primary Examiner* — Joseph S Del Sole
*Assistant Examiner* — Russell Kemmerle, III
(74) *Attorney, Agent, or Firm* — Burr & Brown, PLLC

(57) ABSTRACT

A manufacturing method of a sintered ceramic body mixes barium silicate with aluminum oxide, a glass material, and an additive oxide to prepare a material mixture, molds the material mixture and fires the molded object. The barium silicate is monoclinic and has an average particle diameter in a range of 0.3 μm to 1 μm and a specific surface area in a range of 5 $m^2$/g to 20 $m^2$/g. The aluminum oxide has an average particle diameter in a range of 0.4 μm to 10 μm, a specific surface area in a range of 0.8 $m^2$/g to 8 $m^2$/g. A volume ratio of the aluminum oxide to the barium silicate is in a range of 10% by volume to 25% by volume.

6 Claims, 3 Drawing Sheets

(56) References Cited

U.S. PATENT DOCUMENTS

| | | |
|---|---|---|
| 2002/0171066 A1* | 11/2002 | Venigalla et al. ............. 252/570 |
| 2005/0023032 A1* | 2/2005 | Kawai et al. .................. 174/258 |
| 2006/0194032 A1 | 8/2006 | Furuse et al. |
| 2007/0287012 A1 | 12/2007 | Kawai et al. |
| 2009/0025855 A1 | 1/2009 | Furuse et al. |
| 2011/0200909 A1* | 8/2011 | Parihar et al. ................. 429/469 |

FOREIGN PATENT DOCUMENTS

| | | |
|---|---|---|
| JP | 2001-010858 A1 | 1/2001 |
| JP | 2006-001755 A1 | 1/2006 |
| JP | 2008-105917 A1 | 5/2008 |

* cited by examiner

Example 2
- Al$_2$O$_3$
- BaSi$_2$O$_5$
- h-celsian

Example 38
- Al$_2$O$_3$
- BaSi$_2$O$_5$
- m-celsian

Example 43
- Air hole
- BaSi$_2$O$_5$
- h-celsian

Example 44
- Air hole
- BaSi$_2$O$_5$
- m-celsian

Example 55    hole    crack

Sintered ceramic body layer

Reaction layer

Different dielectric material layer

Example 60

Sintered ceramic body layer (h-celsian)

Middle layer (m-celsian)

Different dielectric material layer

Example 63

Sintered ceramic body layer

Reaction layer

Different dielectric material layer

SINTERED CERAMIC BODY, MANUFACTURING METHOD THEREOF, AND CERAMIC STRUCTURE

CROSS REFERENCE TO RELATED APPLICATIONS

This application is a division of U.S. application Ser. No. 12/913,107 filed Oct. 27, 2010, and claims the benefit under 35 USC §119(a)-(d) of Japanese Patent Application No. 2009-262817 filed Nov. 18, 2009 and Japanese Patent Application No. 2010-102567 filed Apr. 27, 2010, the entireties of which are incorporated herein by reference.

FIELD OF THE INVENTION

The present invention relates to a sintered ceramic body, a manufacturing method of the sintered ceramic body, and a ceramic structure. More specifically the invention pertains to a low-temperature sintered ceramic body that is capable of being fired simultaneously with a low resistance metal, such as silver or copper, as a line conductor, as well as a manufacturing method of such a sintered ceramic boy and a ceramic structure.

BACKGROUND OF THE INVENTION

A conventionally proposed low-temperature sintered ceramic body that is capable of being fired simultaneously with a conductor includes quarts ($SiO_2$) and hexagonal and monoclinic celsian ($BaAl_2Si_2O_8$) in its crystalline phase and has B/A of not greater than 0.2 and C/A of not less than 0.6, where A represents an X-ray intensity of a quarts (101) face, B represents an X-ray intensity of a monoclinic celsian (112) face, and C represents an X-ray intensity of a hexagonal celsian (101) face (see, for example, Japanese Patent Laid-Open No. 2008-105917). This proposed sintered body is expected to have an increased coefficient of thermal expansion and an enhanced chemical resistance. Another proposed sintered ceramic body includes Al, Si, Sr, and Ba as primary components and has $Al_2O_3$ crystals and at least one of hexagonal $SrAl_2Si_2O_8$, $(Sr,Ba)Al_2Si_2O_8$, and $BaAl_2Si_2O_8$ in the structure (see, for example, Japanese Patent Laid-Open No. 2006-001755). This proposed sintered body is expected to have an increased mechanical strength and an improved dielectric characteristic. Still another proposed sintered ceramic body has a content of glass powder in a range of 25% to 34% and a content of alumina ceramic power as a mixture of fine particles and coarse particles in a range of 66% to 75% and average particle diameters of the glass powder and the ceramic powder of less than 1 μm (see, for example, Japanese Patent Laid-Open No. 2001-010858). This proposed sintered body is expected to be densified by low-temperature sintering at a temperature of not higher than 1000° C.

SUMMARY OF THE INVENTION

Japanese Patent Laid-Open No. 2008-105917, however, has no description of the mechanical strength or the Q value representing the resonance characteristic of the sintered ceramic body. The sintered ceramic body disclosed in Japanese Patent Laid-Open No. 2006-001755 has requirement for adding Sr. Addition of Sr to the celsian composition may lead to a phase change from hexagonal celsian to monoclinic celsian and undesirably lower the mechanical strength. The sintered ceramic body disclosed in Japanese Patent Laid-Open No. 2001-010858 is densified by adjustment of the average particle diameter but has insufficient resonance characteristic, which requires a further increase of the Q value. It is thus required to lower the firing temperature and to enhance the mechanical characteristics and the resonance characteristics.

By taking into account the issue discussed above, there is a requirement for providing a sintered ceramic body having a lowered firing temperature and enhanced mechanical characteristics and resonance characteristics, as well as a manufacturing method of such a sintered ceramic body.

The inventors have intensively studied to accomplish at least part of the requirement mentioned above and the other relevant requirements and have completed the present invention based on the finding that the lowered firing temperature and the enhanced mechanical characteristics and resonance characteristics are attainable by setting adequate ranges for the average particle diameter, the specific surface area, and the mixing ratio of barium silicate, aluminum oxide, a predetermined glass material, and a predetermined additive oxide and forming a fine structure with hexagonal celsian located around aluminum oxide particles.

According to one aspect of the present invention, there is provided a sintered ceramic body including a glass component, a predetermined additive oxide component, and aluminum oxide particles included in barium silicate and having a structure with hexagonal celsian located around outer circumferences of the aluminum oxide particles.

According to another aspect of the present invention, there is provided a manufacturing method of a sintered ceramic body. The manufacturing method includes: a material mixing step of mixing barium silicate with aluminum oxide, a predetermined glass material, and a predetermined additive oxide under adoption of conditions (1) and (2) to prepare a material mixture; and a firing step of molding the material mixture to a molded object and firing the molded object at a temperature in a range of not lower than 850° C. and not higher than 1000° C. The condition (1) is that the barium silicate is monoclinic and has an average particle diameter in a range of not less than 0.3 μm and less than 1 μm and a specific surface area in a range of not less than 5 $m^2/g$ and not greater than 20 $m^2/g$. The condition (2) is that the aluminum oxide has an average particle diameter in a range of not less than 0.4 μm and not greater than 10 μm, a specific surface area in a range of not less than 0.8 $m^2/g$ and not greater than 8 $m^2/g$, and a volume ratio of the aluminum oxide to the barium silicate in a range of not less than 10% by volume and not greater than 25% by volume.

The sintered ceramic body of the invention and the manufacturing method thereof effectively lower the firing temperature, while enhancing the mechanical characteristic and the resonance characteristic. The reason of such effects is not clear but may be ascribed to the following presumption. The presence of aluminum oxide particles may result in increasing the toughness. The production of the hexagonal celsian, which has the higher strength than the monoclinic celsian, around the outer circumferences of the aluminum oxide particles may result in increasing the strength. The addition of the glass component and the additive oxide component may result in lowering the sintering temperature. The fine structure of the sintered ceramic body may result in increasing the Q value.

DETAILED DESCRIPTION OF THE INVENTION

Figure 1:
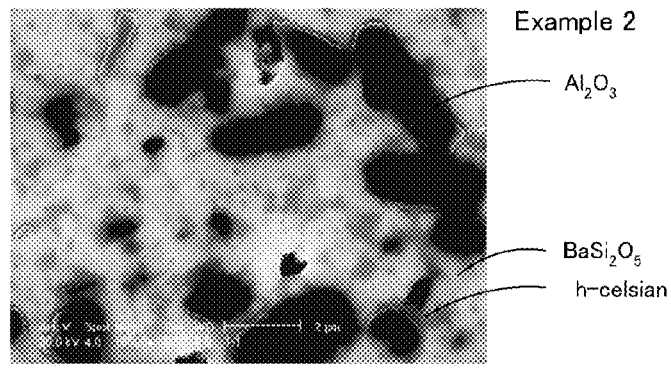
FIG. 1 is scanning electron micrographs of Examples 2, 38, 43, and 44.
Figure 1:
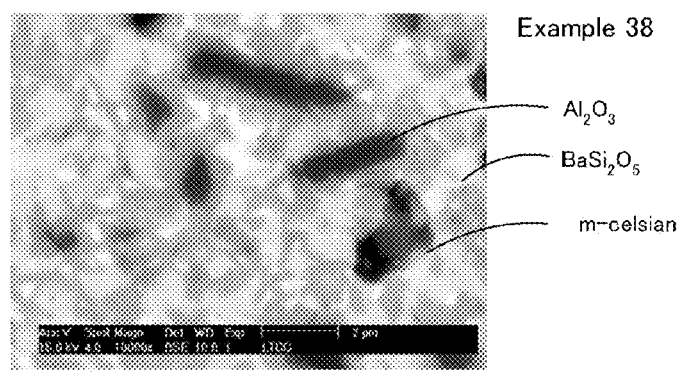
Figure 1:
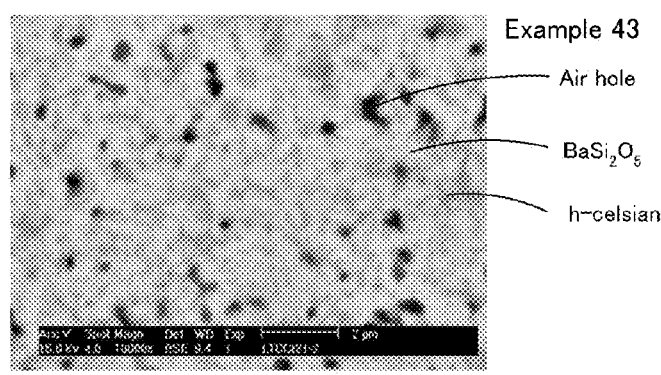
Figure 1:
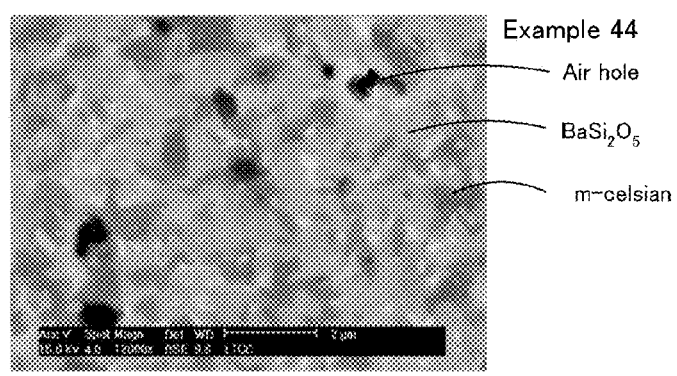

A sintered ceramic body according to one embodiment of the present invention includes a glass component, a predetermined additive oxide component, and aluminum oxide particles added to and mixed with barium silicate and has a structure with hexagonal celsian located around outer circumferences of the aluminum oxide particles. Inclusion of the barium silicate and the aluminum oxide in the material mixture produces celsian and decreases the content of the aluminum oxide during sintering. It is, however, preferable that the aluminum oxide particles still remain in the structure. The presence of the aluminum oxide particles effectively increases the toughness. Monoclinic celsian and hexagonal celsian may be produced during sintering, but the hexagonal celsian is preferable. The production of the hexagonal celsian effectively increases the mechanical strength. The simple inclusion of the celsian is not sufficient, but there is advantageous position. Namely the presence of the celsian around the outer circumferences of the aluminum oxide particles is preferable. This leads to improvement of the mechanical characteristic and the resonance characteristic. More specifically it is preferable that the celsian is present to cover over the outer circumferences of the aluminum oxide particles. The barium silicate, the aluminum oxide, and the celsian are respectively expressed as $BaSi_2O_5$, $Al_2O_3$, and $BaAl_2Si_2O_8$.

In the sintered ceramic body of the invention, when the aluminum oxide has a peak intensity $I_A$ at an angle of about $2\theta=43°$ in X-ray diffractometry and the hexagonal celsian has a peak intensity $I_h$ at an angle of about $2\theta=11°$ in X-ray diffractometry, a peak intensity ratio of $I_A/I_h$ is preferably in a range of not less than 0.2 and not greater than 0.7. The peak intensity ratio of $I_A/I_h$ indicates the crystalline degree of the aluminum oxide and the crystalline degree of the hexagonal celsian.

The aluminum oxide particles included in the sintered ceramic body of the invention preferably has an average particle diameter in a range of not less than 0.4 μm and not greater than 10 μm. The average particle diameter of not less than 0.4 μm effectively increases the mechanical strength, while the average particle diameter of not greater than 10 μm effectively facilitates formation of the sintered body. The average particle diameter of the aluminum oxide particles included in the sintered ceramic body is determined by observing a sectional area of the sintered ceramic body at a magnification capable of measuring the particle diameter of the aluminum oxide particles with a scanning electron microscope (SEM) (for example, 2000-fold to 10000-fold magnification), measuring the shorter diameters of the aluminum oxide particles in the observed area, and averaging the measured values.

The predetermined additive oxide component included in the sintered ceramic body of the invention preferably includes at least one selected from the group consisting of Cu, Mg, B, Zn, Bi, and Zr. Among these elements, Cu, Mg, B, Zn, and Bi are specifically preferable, and Cu is most preferable. Using the additive oxide of Cu allows for the lower-temperature sintering. The predetermined additive oxide component preferably has a content in oxide conversion in a range of not less than 0.5% by weight and not greater than 3% by weight relative to a total weight including the barium silicate and the aluminum oxide. The content of the additive oxide of not less than 0.5% by weight effectively lowers the sintering temperature, while the content of not greater than 3% by weight effectively prevents decrease of the mechanical strength.

The glass component included in the sintered ceramic body of the invention preferably includes Ba, Si, and B. Namely Ba—Si—B—O glass is preferably used as one material of the sintered ceramic body. It is specifically preferable that the glass component includes Ba, Si, B, and Al. Namely Ba—Si—B—Al—O glass is more preferably used as one material of the sintered ceramic body. This effectively lowers the sintering temperature of the sintered barium silicate-aluminum oxide-celsian ceramic body. The glass component preferably has a content of not less than 2% by weight and not greater than 10% by weight relative to the total weight including the barium silicate and the aluminum oxide. The specifically preferable range is not less than 2% by weight and not greater than 8% by weight, and the most preferable range is not less than 2% by weight and not greater than 6% by weight. The glass component is added as a sintering additive. The content of the glass component of not less than 2% by weight effectively prevents deterioration of the sintering performance and a decrease of the mechanical strength, while the content of not greater than 10% by weight effectively prevents a decrease of the Q value as the resonance characteristic. The content of the glass component in a range of 8% by weight to 10% by weight tends to lower the resonance characteristic but attains the further decrease of the sintering temperature. The content of the glass component in a range of 2% by weight to 6% by weight tends to increase the sintering temperature but attains the further improvement of the resonance characteristic.

The sintered ceramic body of the invention preferably has a three-point bending strength of not less than 250 MPa. The three-point bending strength of not less than 275 MPa is specifically preferable. Members having the three-point bending strength of not less than 250 MPa are suitably usable for electronic parts including circuit parts. The three-point bending strength is an evaluated value in conformity with a standard JIS-R1601.

The sintered ceramic body of the invention preferably has a Q value of not less than 2000 at a frequency of 3.0 GHz. The Q value of not less than 2500 is specifically preferable, and the Q value of not less than 3000 is more preferable. Members having the Q value of not less than 2000 are suitably usable for electronic parts including circuit parts. The lower glass content in the material is required for the higher Q value. Reduction of the glass content, however, results in a manufacturing problem of lowering the allowable content of the aluminum oxide particles that contribute to the increased toughness and the enhanced strength. Namely there is such a correlation between the Q value and the three-point bending strength that an increase of one factor leads to a decrease of the other factor. The Q value and the three-point bending strength may thus be selected adequately for the application in a specific range of the Q value of not less than 2000 and the three-point bending strength of not less than 250 MPa. In some applications, the Q value may be allowed to be not less than 1000 at the frequency of 3.0 GHz. The sintered ceramic body of the invention preferably has a permittivity $\in$ of not lower than 7.0 or more specifically not less than 7.2. Members having the permittivity $\in$ of not lower than 7.0 are suitably usable for electronic parts including circuit parts.

The sintered ceramic body of the invention preferably has an open porosity of not higher than 0.5%. The open porosity of not higher than 0.25% is specifically preferable, and the open porosity of not higher than 0.1% is more preferable. The open porosity of not higher than 0.5% effectively increases the mechanical strength and the Q value. The sintered ceramic body of the invention preferably has a bulk density of not lower than 3.30 g/cm$^3$. The bulk density of not lower than 3.50 g/cm$^3$ is specifically preferable, and the bulk density of not lower than 3.60 g/cm$^3$ is more preferable.

The sintered ceramic body of the invention preferably has a thermal expansion coefficient of not lower than 10.0 (1/K) in a temperature range of 40 to 800° C. The thermal expansion coefficient of not lower than 11.0 (1/K) is specifically preferable. By taking into account mounting the sintered ceramic body on a printed circuit board, the thermal expansion efficient of not higher than 12.0 (1/K) is preferable to prevent the peel-off or generation of cracks due to a difference in thermal expansion between the sintered ceramic body and the printed circuit board.

The sintered ceramic body of the invention may include Ba having a content in a range of 38% by weight to 48% by weight, Si having a content in a range of 30% by weight to 39% by weight, Al having a content in a range of 10% by weight to 25% by weight, and B having a content in a range of 0.3% by weight to 2.5% by weight, all in oxide conversion. The sintered ceramic body of the invention may additionally include Cu as the additive oxide component having a content in a range of 0.4% by weight to 3.0% by weight in oxide conversion. At least one of Mg, B, Zn, Bi, and Zr may be added to the sintered ceramic body, in addition to or in place of Cu. The sintered ceramic body of the invention preferably has a Sr content of not higher than 0.5% by weight in oxide conversion. The Sr content of not higher than 0.01% by weight is specifically preferable. The Sr content of not higher than 0.5% effectively prevents generation of monoclinic celsian. The sintered ceramic body of the invention preferably has a less presence or more preferably substantially no presence of a Sr-containing crystalline phase. The Sr-containing crystalline phase may be, for example, $SrAl_2Si_2O_8$ or $(Sr,Ba)Al_2Si_2O_8$.

The sintered ceramic body of the invention may be used for a multilayer circuit board. The multilayer circuit board is provided with electrodes. Preferable examples of the electrode material include W, Mo, Ag, Au and Cu, and Cu and Ag having the lower electrical resistance are especially preferable. In the use of Cu or Ag as the electrode material, the firing temperature of not higher than 1000° C., specifically not higher than 960° C., or more specifically not higher than 920° C. is preferable to allow for simultaneous firing of the ceramic body and the electrodes. This gives the great significance to application of the low-temperature sintered ceramic body of the invention having the high strength and the enhanced resonance characteristic to the multilayer circuit board.

A manufacturing method of the sintered ceramic body according to the invention is described below. The manufacturing method may include a material preparation step of mixing a barium compound with a silicon compound to prepare monoclinic barium silicate, a material mixing step of mixing the monoclinic barium silicate with aluminum oxide, a predetermined glass material, and a predetermined additive oxide to prepare a material mixture, and a firing step of molding the material mixture to a molded object and firing the molded object. Alternatively, the manufacturing method may separately provide the monoclinic barium silicate with omission of the material preparation step. The respective steps are described in detail below.

Material Preparation Step

The material preparation step mixes a barium compound with a silicon compound and fires the mixed barium compound and silicon compound without addition of Bi and Zn to prepare monoclinic barium silicate ($BaSi_2O_5$). Although the barium compound may be any of carbonates, chlorides, and oxides of barium, carbonates of barium are preferable. A preferable example of the silicon compound is silicon oxide ($SiO_2$). The material preparation step weighs and mixes the barium compound and the silicon compound such as to have the composition of barium silicate ($BaSi_2O_5$). The compounds may be subject to dry mixing or wet mixing, but the wet mixing procedure is preferable. This step includes non-addition of Bi or Zn as a sintering additive. The non-addition of such sintering additives makes it difficult to lower the firing temperature but effectively prevents generation of orthorhombic barium silicate. The use of the monoclinic barium silicate for the material of the sintered ceramic body desirably increases the potential of generating hexagonal celsian. The material preparation step subsequently fires the mixed powdery compounds. The mixed compounds are preferably fired in, for example, an inert gas atmosphere. The firing temperature is preferably in a range of not lower than 1100° C. and not higher than 1250° C. The monoclinic barium silicate thus obtained is subsequently subject to wet crushing to have desired ranges of an average particle diameter and a specific surface area described below.

Material Mixing Step

The material mixing step mixes the barium silicate with aluminum oxide, a predetermined glass material, and a predetermined additive oxide under adoption of conditions (1) and (2) given below to prepare a material mixture. The material mixing step may further adopt a condition (3) and a condition (4) given below to prepare the material mixture:

(1) The barium silicate is monoclinic and has an average particle diameter in a range of not less than 0.3 µm and less than 1 µm and a specific surface area in a range of not less than 5 m$^2$/g and not greater than 20 m$^2$/g;

(2) The aluminum oxide has an average particle diameter in a range of not less than 0.4 µm and not greater than 10 µm, a specific surface area in a range of not less than 0.8 m$^2$/g and not greater than 8 m$^2$/g, and a volume ratio of the aluminum oxide to the barium silicate in a range of not less than 10% by volume and not greater than 25% by volume;

(3) The predetermined glass material is Ba—Si—B—O glass and has a content in a range of not less than 2% by weight and not greater than 10% by weight, preferably in a range of not less than 2% by weight and not greater than 8% by weight, and more preferably in a range of not less than 2% by weight and not greater than 6% by weight, relative to a total weight including the barium silicate and the aluminum oxide; and (4) The predetermined additive oxide is at least one oxide selected from the group consisting of Cu, Mg, B, Zn, Bi, and Zr and has a content in a range of not less than 0.5% by weight and not greater than 3% by weight relative to a total weight including the barium silicate and the aluminum oxide.

The use of the monoclinic barium silicate desirably allows for predominant generation of hexagonal celsian. The use of the orthorhombic barium silicate as the material of the sintered ceramic body increases the potential of generating monoclinic celsian. The use of the barium silicate having the average particle diameter of not less than 0.3 µm preferably facilitates production of barium silicate particles, while the use of the barium silicate having the average particle diameter of less than 1 µm preferably enhances the mechanical strength. The average particle diameter of the material powder represents a 50% median diameter measured with a laser diffraction/scattering particle size distribution analyzer. The barium silicate having the specific surface area in the range of not less than 5 m$^2$/g and not greater than 20 m$^2$/g preferably has the high reactivity. The average particle diameter includes the particle diameter of primary particles and the particle diameter of secondary particles as aggregation of the primary particles. The use of the barium silicate having the specific surface area of not greater than 20 m²/g effectively prevents a potential problem caused by the secondary particles as aggregation of the fine primary particles.

The use of the aluminum oxide having the average particle diameter of not less than 0.4 μm preferably allows the aluminum oxide particles to remain after sintering, while the use of the aluminum oxide having the average particle diameter of not greater than 10 μm preferably facilitates formation of a molded object. The aluminum oxide having the specific surface area in the range of not less than 0.8 m²/g and not greater than 8 m²/g preferably has the high reactivity with the barium silicate. The volume ratio of the aluminum oxide to the barium silicate of not less than 10% by volume preferably enhances the mechanical strength, while the volume ratio of the aluminum oxide to the barium silicate of not greater than 25% by volume preferably enhances the densification of the resulting sintered body. The predetermined glass material added to the material mixture is preferably Ba—Si—B—O glass and more preferably Ba—Si—B—Al—O glass. The Ba—Si—B—O glass desirably lowers the sintering temperature of the ceramic body of the barium silicate-aluminum oxide-celsian. The content of the predetermined glass material of not less than 2% by weight preferably lowers the sintering temperature, while the content of the predetermined glass material of not greater than 10% by weight preferably prevents fusion of the sintered body. The content of the predetermined glass material in a range of 8% by weight to 10% by weight tends to degrade the resonance characteristic but further lowers the firing temperature. The content of the predetermined glass material in a range of 2% by weight to 6% by weight tends to increase the firing temperature but upgrades the resonance characteristic. The content of the predetermined glass material and the firing temperature may be selected adequately, depending on the priority among the firing temperature, the mechanical strength, and the resonance characteristic. The predetermined additive oxide is preferably at least one oxide selected from the group consisting of Cu, Mg, B, Zn, Bi, and Zr. These oxides preferably lower the sintering temperature of the ceramic body of the barium silicate-aluminum oxide-celsian. The content of the predetermined additive oxide of not less than 0.5% by weight preferably lowers the sintering temperature, while the content of the predetermined additive oxide of not greater than 3% by weight preferably prevents fusion of the sintered body.

The material mixture preferably has no addition of Sr. Non-patent Document 1 (Journal of European Ceramic Society 27 (2007), 1181-1185) has reported that the presence of Sr facilitates a phase change from hexagonal celsian to monoclinic celsian. The less content of Sr in the material mixture is accordingly desirable: the content of Sr of not greater than 0.5% by weight in oxide conversion is preferable, and the content of Sr of not greater than 0.01% by weight is specifically preferable.

Firing Step

The firing step molds the material mixture to a molded object and fires the molded object at a temperature in a range of not lower than 850° C. and not higher than 1000° C. The material mixture may be molded, for example, by die molding, extrusion, tape forming, or slip casting. A preferable procedure performs CIP treatment prior to the firing, so as to give the sintered body of the higher denseness. The firing temperature of not lower than 850° C. preferably enhances the mechanical strength of the resulting sintered ceramic body, while the firing temperature of not higher than 1000° C. preferably reduces the energy consumption during firing. The firing temperature is preferably not higher than 960° C. and more specifically not higher than 920° C. For example, in applications of mounting electrodes on the sintered ceramic body, the firing temperature of not higher than 960° C. enables the ceramic body and Cu electrodes to be sintered simultaneously. The firing temperature of not higher than 920° C. enables the ceramic body and Ag electrodes to be sintered simultaneously. This arrangement desirably has the higher energy efficiency than the arrangement of separately firing the ceramic body and the electrodes. The firing conditions may be selected adequately to give desired characteristics, for example, a desired mechanical strength, according to the application. For example, the content of the predetermined glass material in the range of 8% by weight to 10% by weight allows the firing temperature to be set in a range of not lower than 850° C. and not higher than 920° C. In another example, the content of the predetermined glass material in the range of 2% by weight to 6% by weight allows the firing temperature to be set in a range of not lower than 910° C. and not higher than 960° C.

The sintered ceramic body and the manufacturing method thereof according to the embodiment of the invention described above effectively lower the firing temperature, while enhancing the mechanical characteristics and the resonance characteristics. The reason of such effects is not clear but may be ascribed to the following presumption. The presence of aluminum oxide particles may result in increasing the toughness. The production of the hexagonal celsian, which has the higher strength than the monoclinic celsian, around the outer circumferences of the aluminum oxide particles may result in increasing the strength. The addition of the glass component and the additive oxide component may result in lowering the sintering temperature. The fine structure of the sintered ceramic body may result in increasing the Q value.

The embodiment discussed above is to be considered in all aspects as illustrative and not restrictive. There may be various modifications, changes, and alterations without departing from the scope or spirit of the main characteristics of the present invention.

The invention is not restricted to the embodiment of the sintered ceramic body described above. According to another embodiment of the invention, a ceramic structure may have a layered structure of at least a ceramic layer of the sintered ceramic body having any of the arrangements described above and a dielectric layer of a dielectric material having a relative permittivity of not lower than 5 and not higher than 2500. Namely the sintered ceramic body may be combined with a suitable dielectric material. Typical examples of the dielectric material having the relative permittivity of not lower than 5 and not higher than 2500 include barium titanate ($BaTiO_3$), lead zirconate titanate ($Pb(Zr,Ti)O_3$), lithium niobate ($LiNbO_3$), lithium tantalate (LiTaO3), lead niobate ($PbNb_2O_6$), and cadmium niobate ($Cd_2Nb_2O_7$). The ceramic layer may have a thickness 'tc' of not less than 15 μm. The dielectric layer may have a thickness 'td' of not less than 15 μm. The ceramic layer and the dielectric layer may be formed to have the thicknesses of the above respective ranges by pressing. The ceramic layer and the dielectric layer may be formed by stacking and pressure bonding multiple layers of tapes obtained by tape forming.

According to further another embodiment of the invention, a ceramic structure may have a layered structure of a ceramic layer of the sintered ceramic body having any of the arrangements described above, a dielectric layer of a dielectric material having a relative permittivity of not lower than 5 and not higher than 2500, and a middle layer located between the ceramic layer and the dielectric layer. The sintered ceramic body of the invention has the lowered sintering temperature and the enhanced mechanical characteristics and resonance characteristics attained by regulating the amounts of minor elements and components. In a composite layered structure of the sintered ceramic body with another material, diffusion of some element included in the dielectric material may degrade the bonding between the ceramic layer and the dielectric layer. For example, the dielectric layer may include a specific element of causing a phase change from hexagonal celsian to monoclinic celsian. This phase change may induce a volume change and cause cracking at an interface, resulting in separation of the ceramic layer from the dielectric layer. The presence of the middle layer between the ceramic layer and the dielectric layer assures the secure bonding between the ceramic layer and the dielectric layer. The middle layer may be composed of a material that prevents the specific element of causing the phase change from the hexagonal celsian to the monoclinic celsian from diffusing into the ceramic layer. Alternatively the middle layer may be composed of a material that prevents the phase change from the hexagonal celsian to the monoclinic celsian. The middle layer preferably includes monoclinic celsian. The inclusion of the monoclinic celsian as the phase change product gives a relatively stable middle layer. The middle layer has a thickness 'tm' preferably in a range of not less than 3.0 μm and not greater than 40 μm or more preferably in a range of not less than 3 μm and not greater than 30 μm. The thickness 'tm' of the middle layer of or above 3.0 μm preferably prevents diffusion of the specific element into the ceramic layer, while the thickness 'tm' of the middle layer of or below 40 μm preferably prevents deterioration of the resonance characteristics. A ratio 'tm/tc' of the thickness 'tm' of the middle layer to the thickness 'tc' of the ceramic layer is preferably in a range of not lower than 0.005 and not higher than 0.07 and is more preferably in a range of not lower than 0.005 and not higher than 0.05. The ratio 'tm/tc' of or above 0.005 preferably prevents diffusion of the specific element into the ceramic layer, while the ratio 'tm/tc' of or below 0.07 preferably prevents deterioration of the resonance characteristics. In one preferable embodiment of the ceramic structure of the invention, a reaction layer is formed at an interface of the dielectric layer to have a thickness of not greater than 3 μm. The reaction layer contributes to bonding between the dielectric layer and the middle layer. The thickness of the reaction layer of or below 3 μm preferably prevents diffusion of the specific element into the ceramic layer. The specific element of causing the phase change from the hexagonal celsian to the monoclinic celsian may be, for example, Zn, Sr, Li, Na, Ca, or Ti. The specific element may be included in the glass component added as a sintering additive.

According to another embodiment of the invention, a ceramic structure may have a layered structure of a ceramic layer of the sintered ceramic body having any of the arrangements described above and a dielectric layer of a dielectric material having a relative permittivity of not lower than 5 and not higher than 2500 and having a content of less than 1.5% by weight of a specific element of causing a phase change from hexagonal celsian to monoclinic celsian. This arrangement more effectively prevents the phase change from the hexagonal celsian to the monoclinic celsian in the ceramic layer and assures the securer bonding between the ceramic layer and the dielectric layer. In the dielectric layer, the content of the specific element of causing the phase change from the hexagonal celsian to the monoclinic celsian is less than 1.5% by weight, preferably not greater than 1.0% by weight, or more preferably not greater than 0.5% by weight in oxide conversion. The content of the specific element of less than 1.5% by weight in oxide conversion preferably prevents the phase change from the hexagonal celsian to the monoclinic celsian in the ceramic layer. In one preferable embodiment of the ceramic structure of the invention, a reaction layer is formed at an interface of the dielectric layer to have a thickness of not greater than 3 μm. The reaction layer contributes to bonding between the dielectric layer and the ceramic layer. The thickness of the reaction layer of or below 3 μm preferably prevents diffusion of the specific element into the ceramic layer. Another preferable embodiment of the ceramic structure of the invention may have a further reduced content of the specific element of causing the phase change from the hexagonal celsian to the monoclinic celsian and include a middle layer located between the ceramic layer and the dielectric layer as explained above.

EXAMPLES

Concrete examples of the sintered ceramic body according to the invention are described below.

Preparation of Monoclinic Barium Silicate ($BaSi_2O_5$)

Barium silicate ($BaSi_2O_5$) was prepared as the material of a ceramic composition (sintered body). Materials $BaCO_3$ (high-purity barium carbonate: 99.9% manufactured by Sakai Chemical Industry Co., Ltd.) and $SiO_2$ (EXCELICA® SE-1 manufactured by Tokuyama Corporation) were weighed according to the composition of $BaSi_2O_5$. No sintering additives were added. The weighed materials were added to a solvent (isopropyl alcohol: IPA), were wet mixed with a ball mill of $ZrO_2$ cobbles of 2 mm in diameter, and were dried to obtain powder material. The powder material was sieved through a #100 sieve, was dried, and was fired in the atmosphere at 1200° C. for 6 hours. The sintered material (monoclinic $BaSi_2O_5$) was coarsely crushed in an agate mortar, was added to an IPA solvent, and was wet crushed with a ball mill of $ZrO_2$ cobbles. The wet crushed material was dried to give fine powder of monoclinic $BaSi_2O_5$. The crushing condition was set to give powders having the average particle diameters (50% median diameters) of 0.3 μm, 0.5 μm, and 1.0 μm. The powders having the respective average particle diameters were thus obtained. The average particle diameter of the powder was the 50% median diameter measured after 1-minute ultrasonic dispersion with a laser diffraction/scattering particle size distribution analyzer (LA920 manufactured by Horiba Ltd).

Preparation of Orthorhombic Barium Silicate ($BaSi_2O_5$)

The same materials $BaCO_3$ and $SiO_2$ as discussed above were weighed according to the composition of $BaSi_2O_5$. 3.2 parts by weight of $Bi_2$ (bismuth oxide manufactured by Kojundo Chemical Laboratory Co., Ltd) and 4.0 parts by weight of ZnO (99.9% zinc oxide manufactured by Kojundo Chemical Laboratory Co., Ltd) were added as sintering additives and were mixed with 92.8 parts by weight of the weighed materials. The material mixture was subjected to the same procedure as described above with regard to monoclinic $BaSi_2O_5$ except the firing temperature of 900° C. to give fine powder of orthorhombic $BaSi_2O_5$. The crushing condition was set to give powder of orthorhombic $BaSi_2O_5$ having the average particle diameter of 0.5 μm.

Preparation of Glass Component as Auxiliary Agent

Glass components used as auxiliary agents were prepared from materials $BaCO_3$ (high-purity barium carbonate: 99.9% manufactured by Sakai Chemical Industry Co., Ltd.), $SiO_2$ (EXCELICA® SE-1 manufactured by Tokuyama Corporation), $Al_2O$, (RA40 manufactured by Iwatani Chemical Industry Co., Ltd), HBO (boric acid manufactured by Sigma-Aldrich Co.), MgO (manufactured by Kyowa Chemical Industry Co., Ltd), $Na_2CO_3$ (manufactured by Kanto Chemical Co., Inc), and ZnO (manufactured by Kojundo Chemical Laboratory Co., Ltd). The respective materials were weighed according to each desired composition, were mixed for 30 minutes, and were molten in a platinum crucible in the atmosphere at 1500° C. for 4 hours. The molten material was flowed into water and was quenched to obtain glass cullets. The glass cullets were crushed in an agate mortar, was sieved through a #100 sieve, was wet crushed with a bal mill to obtain slurry, and was dried to yield glass powder. The wet crushing with IPA as a solvent was performed for 24 hours with a ball mill of $ZrO_2$ cobbles of 5 mm in diameter. The glass powders thus obtained were a Ba—Si—B—O glass component, a Mg—Ba—Si—B—O glass component, two Ba—Si—O glass components, and a Na—Si—Zn—O glass component.

Example 1

A ceramic composition (sintered body) of Example 1 was produced according to the following procedure. The monoclinic $BaSi_2O_5$ and $Al_2O_3$ (AN31A manufactured by Nippon Light Metal Company Ltd) were mixed at a volume ratio of 85 to 15. The monoclinic $BaSi_2O_5$ used had the average particle diameter of 0.5 µm. The aluminum oxide $Al_2O$ used had the average particle diameter of 4.7 µm and the specific surface area of 1.1 $m^2/g$. The specific surface area was measured by the nitrogen adsorption method with a BET surface area analyzer (Flow Sorb 2300 manufactured by Shimadzu Corporation). 6 Parts by weight of the Ba—Si—B—O glass component prepared and 0.5 parts by weight of CuO (Copper Oxide (II) ET manufactured by Nihon Kagaku Sangyo Co., Ltd) were added as auxiliary agents to 100 parts by weight of the above mixed materials, were wet crushed under the same conditions as those described above, and were dried to obtain a material mixture. The elemental analysis of the glass component by ICP emission spectroscopy indicated a composition containing 34.44% by weight of $SiO_2$, 21.35% by weight of BaO, 34.50% by weight of $B_2O_3$, and 9.71% by weight of $Al_2O_3$. The obtained material mixture of 15 grams was molded to a shape of 35 mm in diameter under a pressure of 76 $kg/cm^2$. The molded object was subjected to CIP treatment under a pressure of 3000 $kg/cm^2$ for 30 seconds and was fired in the atmosphere at 920° C. for 1.5 hours. This gave a sintered body of Example 1.

Examples 2 to 6

A sintered body of Example 2 was obtained according to the same procedure as Example 1 described above except the volume ratio of the monoclinic $BaSi_2O_5$ to $Al_2O_3$ set to 80 to 20 and addition of 1.0 part by weight of CuO as the auxiliary agent. A sintered body of Example 3 was obtained according to the same procedure as Example 1 described above except the volume ratio of the monoclinic $BaSi_2O_5$ to $Al_2O_3$ set to 80 to 20 and addition of 1.5 part by weight of CuO as the auxiliary agent. A sintered body of Example 4 was obtained according to the same procedure as Example 1 described above except the volume ratio of the monoclinic $BaSi_2O_5$ to $Al_2O_3$ set to 75 to 25 and addition of 1.5 part by weight of CuO as the auxiliary agent. A sintered body of Example 5 was obtained according to the same procedure as Example 1 described above except the volume ratio of the monoclinic $BaSi_2O_3$ to $Al_2O_3$ set to 75 to 25 and addition of 2.0 part by weight of CuO as the auxiliary agent. A sintered body of Example 6 was obtained according to the same procedure as Example 1 described above except the volume ratio of the monoclinic $BaSi_2O_5$ to $Al_2O_3$ set to 75 to 25 and addition of 3.0 part by weight of CuO as the auxiliary agent.

Example 7

A sintered body of Example 7 was obtained according to the same procedure as Example 2 described above except the firing temperature of 880° C.

Examples 8 to 10

A sintered body of Example 8 was obtained according to the same procedure as Example 2 described above except addition of 4.0 parts by weight of the glass component as the auxiliary agent. A sintered body of Example 9 was obtained according to the same procedure as Example 2 described above except addition of 5.0 parts by weight of the glass component as the auxiliary agent. A sintered body of Example 10 was obtained according to the same procedure as Example 2 described above except addition of 6.6 parts by weight of the glass component as the auxiliary agent.

Examples 11 to 14

A sintered body of Example 11 was obtained according to the same procedure as Example 2 described above except addition of 2.5 parts by weight of the glass component as the auxiliary agent and the firing temperature of 960° C. A sintered body of Example 12 was obtained according to the same procedure as Example 2 described above except addition of 4.0 parts by weight of the glass component as the auxiliary agent and the firing temperature of 960° C. A sintered body of Example 13 was obtained according to the same procedure as Example 2 described above except addition of 6.0 parts by weight of the glass component as the auxiliary agent and the firing temperature of 960° C. A sintered body of Example 14 was obtained according to the same procedure as Example 2 described above except addition of 7.0 parts by weight of the glass component as the auxiliary agent and the firing temperature of 960° C.

Examples 15 to 17

A sintered body of Example 15 was obtained according to the same procedure as Example 2 described above except the volume ratio of the monoclinic $BaSi_2O_5$ to $Al_2O_3$ set to 90 to 10. A sintered body of Example 16 was obtained according to the same procedure as Example 2 described above except the volume ratio of the monoclinic $BaSi_2O_3$ to $Al_2O_3$ set to 85 to 15. A sintered body of Example 17 was obtained according to the same procedure as Example 2 described above except the volume ratio of the monoclinic $BaSi_2O_5$ to $Al_2O_3$ set to 75 to 25.

Examples 18 to 21

A sintered body of Example 18 was obtained according to the same procedure as Example 2 described above except the use of $Al_2O_3$ (AES11C manufactured by Sumitomo Chemical Co., Ltd) having the average particle diameter of 0.4 µm and the specific surface area of 6.6 $m^2/g$ and the volume ratio of the monoclinic $BaSi_2O_5$ to $Al_2O_3$ set to 85 to 15. A sintered body of Example 19 was obtained according to the same procedure as Example 2 described above except the use of $Al_2O_3$ (RA40 manufactured by Iwatani Chemical Industry Co., Ltd) having the average particle diameter of 1.0 µm and the specific surface area of 3.5 $m^2/g$ and the volume ratio of the monoclinic $BaSi_2O_5$ to $Al_2O$ set to 85 to 15. A sintered body of Example 20 was obtained according to the same procedure as Example 2 described above except the use of $Al_2O_3$ (A-78 manufactured by Showa Denko K.K.) having the average particle diameter of 2.6 μm and the specific surface area of 3.3 m²/g and the volume ratio of the monoclinic $BaSi_2O_5$ to $Al_2O_3$ set to 80 to 20. A sintered body of Example 21 was obtained according to the same procedure as Example 2 described above except the use of $Al_2O_3$ (A-44 manufactured by Showa Denko K.K.) having the average particle diameter of 6.7 μm and the specific surface area of 0.9 m²/g and the volume ratio of the monoclinic $BaSi_2O_5$ to $Al_2O_3$ set to 80 to 20.

Examples 22 to 26

A sintered body of Example 22 was obtained according to the same procedure as Example 2 described above except addition of 1.0 part by weight of MgO (magnesium oxide T manufactured by Kyowa Chemical Industry Co., Ltd) in place of CuO as the auxiliary agent and the firing temperature of 960° C. A sintered body of Example 23 was obtained according to the same procedure as Example 2 described above except addition of $H_3BO_3$ (boric acid manufactured by Sigma-Aldrich Co.) to be 1.0 part by weight of $B_2O_3$ in place of CuO as the auxiliary agent and the firing temperature of 960° C. A sintered body of Example 24 was obtained according to the same procedure as Example 2 described above except addition of 1.0 part by weight of ZnO (99.9% zinc oxide manufactured by Kojundo Chemical Laboratory Co., Ltd) in place of CuO as the auxiliary agent and the firing temperature of 960° C. A sintered body of Example 25 was obtained according to the same procedure as Example 2 described above except addition of 1.0 part by weight of $Bi_2O_3$ (bismuth oxide manufactured by Kojundo Chemical Laboratory Co., Ltd) in place of CuO as the auxiliary agent and the firing temperature of 960° C. A sintered body of Example 26 was obtained according to the same procedure as Example 2 described above except addition of 1.0 part by weight of $ZrO_2$ (TZ-0 manufactured by Tosoh Corporation) in place of CuO as the auxiliary agent and the firing temperature of 960° C.

Examples 27 and 28

A sintered body of Example 27 was obtained according to the same procedure as Example 2 described above except no addition of CuO as the auxiliary agent and the firing temperature of 1100° C. A sintered body of Example 28 was obtained according to the same procedure as Example 2 described above except no addition of CuO as the auxiliary agent and the firing temperature of 1300° C.

Examples 29 to 31

A sintered body of Example 29 was obtained according to the same procedure as Example 2 described above except addition of no glass component as the auxiliary agent. A sintered body of Example 30 was obtained according to the same procedure as Example 2 described above except addition of 1.0 part by weight of the glass component as the auxiliary agent. A sintered body of Example 31 was obtained according to the same procedure as Example 2 described above except addition of 10 parts by weight of the glass component as the auxiliary agent.

Examples 32 to 35

A sintered body of Example 32 was obtained according to the same procedure as Example 2 described above except no addition of $Al_2O_3$. A sintered body of Example 33 was obtained according to the same procedure as Example 2 described above except the volume ratio of the monoclinic $BaSi_2O_5$ to $Al_2O_3$ set to 95 to 5. A sintered body of Example 34 was obtained according to the same procedure as Example 2 described above except the volume ratio of the monoclinic $BaSi_2O_5$ to $Al_2O_3$ set to 70 to 30. A sintered body of Example 35 was obtained according to the same procedure as Example 2 described above except the use of $Al_2O_3$ (RA40 manufactured by Iwatani Chemical Industry Co., Ltd) having the average particle diameter of 0.5 μm and the specific surface area of 48 m²/g.

Example 36

A sintered body of Example 36 was obtained according to the same procedure as Example 2 described above except addition of 1.0 part by weight of $TiO_2$ (titanium dioxide 3N manufactured by Kojundo Chemical Laboratory Co., Ltd) in place of CuO as the auxiliary agent and the firing temperature of 960° C.

Examples 37 and 38

A sintered body of Example 37 was obtained according to the same procedure as Example 20 described above except the use of orthorhombic $BaSi_2O_5$ and the volume ratio of the orthorhombic $BaSi_2O_5$ to $Al_2O_3$ set to 90 to 10. A sintered body of Example 38 was obtained according to the same procedure as Example 37 described above except the firing temperature of 1000° C. The orthorhombic $BaSi_2O_5$ contains 3.2 parts by weight of $Bi_2O_3$ and 4.0 parts by weight of ZnO.

Examples 39 to 42

A sintered body of Example 39 was obtained according to the same procedure as Example 16 described above except the use of the Mg—Ba—Si—B—O glass component as the auxiliary additive. The elemental analysis of the glass component of Example 39 indicated a composition containing 14.00% by weight of $SiO_2$, 12.00% by weight of BaO, 25.00% by weight of $B_2O_3$, 2.00% by weight of $Al_2O_3$, and 47.00% by weight of MgO. A sintered body of Example 40 was obtained according to the same procedure as Example 16 described above except the use of the Ba—Si—O glass component as the auxiliary additive. The elemental analysis of the glass component of Example 40 indicated a composition containing 45.00% by weight of $SiO_2$, 51.60 by weight of BaO, and 3.40% by weight of $Al_2O_3$. A sintered body of Example 41 was obtained according to the same procedure as Example 16 described above except the use of the Ba—Si—O glass component as the auxiliary additive. The elemental analysis of the glass component of Example 41 indicated a composition containing 16.40% by weight of $SiO_2$, and 83.60% by weight of BaO. A sintered body of Example 42 was obtained according to the same procedure as Example 16 described above except the use of the Na—Si—Zn—O glass component as the auxiliary additive. The elemental analysis of the glass component of Example 42 indicated a composition containing 40.00% by weight of $SiO_2$, 40.00% by weight of ZnO, and 20.00% by weight of $Na_2O$.

Examples 43 and 44

A sintered body of Example 43 was obtained according to the same procedure as Example 2 described above except no addition of $Al_2O_3$, addition of 6.0 parts by weight of the glass component as the auxiliary additive to 100 parts of hexagonal celsian (hereafter may be referred to as h-celsian), and addition of 1.0 part by weight of CuO as the auxiliary additive. Powder synthesized as described below was used as the hexagonal celsian. A sintered body of Example 44 was obtained according to the same procedure as Example 2 described above except no addition of $Al_2O_3$, addition of 6.0 parts by weight of the glass component as the auxiliary additive to 100 parts of monoclinic celsian (hereafter may be referred to as m-celsian), and addition of 1.0 part by weight of CuO as the auxiliary additive. Powder synthesized as described below was used as the monoclinic celsian.

Preparation of Hexagonal (h) Celsian and Monoclinic (m) Celsian

The celsians used in Examples 43 and 44 were prepared by the following procedure. The celsians $BaAl_2Si_2O_8$ (h-celsian and m-celsian) were synthesized from $BaCO_3$ (high-purity barium carbonate: 99.9% manufactured by Sakai Chemical Industry Co., Ltd.), $SiO_2$ (EXCELICA® SE-1 manufactured by Tokuyama Corporation), $Al_2O_3$ (RA40 manufactured by Iwatani Chemical Industry Co., Ltd), and calcined kaolin $Al_2O_3.2SiO_2$ (manufactured by Engelhard Corporation) as materials. The materials $BaCO_3$, $SiO_2$, and $Al_2O_3$ were weighed to satisfy a molar ratio of $BaO:Al_2O_3:SiO_2$ equal to 1:1:2 and were mixed in a solvent IPA with a ball mill for 4 hours to obtain slurry. The slurry was sieved through a #100 sieve and was dried in a nitrogen atmosphere at 110° C. for 16 hours to yield powder. The yielded powder was fired in the atmosphere at 1500° C. for 6 hours, was crushed in an agate mortar, was sieved through a #100 sieve, was wet crushed with a ball mill of $ZrO_2$ cobbles of 5 mm in diameter for 20 hours, and was dried to obtain the h-celsian synthetic powder. The m-celsian synthetic powder was obtained from $BaCO_3$ and calcined kaolin weighed o satisfy a molar ratio of $BaO:Al_2O_3:SiO_2$ equal to 1:1:2 according to the same procedure as described above with regard to the h-celsian.

Examples 45 to 49

A sintered body of Example 45 was obtained according to the same procedure as Example 15 described above except the use of $MgAl_2O_4$ (Shospinel® FAM manufactured by Showa Denko K.K) in place of $Al_2O_3$ as reinforcement particles. A sintered body of Example 46 was obtained according to the same procedure as Example 15 described above except the use of $2Al_2O_3.SiO_2$ (Shomullite® RM manufactured by Showa Denko K.K) in place of $Al_2O_3$. A sintered body of Example 47 was obtained according to the same procedure as Example 15 described above except the use of cordierite ($2MgO.5SiO_2.2Al_2O_3$) in place of $Al_2O_3$. A sintered body of Example 48 was obtained according to the same procedure as Example 15 described above except the use of $ZrO_2$ (TZ-0 manufactured by Tosoh Corporation) in place of $Al_2O_3$. A sintered body of Example 49 was obtained according to the same procedure as Example 15 described above except the use of MgO (magnesium oxide T manufactured by Kyowa Chemical Industry Co., Ltd) in place of $Al_2O_3$.

Example 50

A sintered body of Example 50 was obtained according to the same procedure as Example 2 described above except the use of the monoclinic $BaSi_2O_5$ having the average particle diameter of 0.3 μm and the specific surface area of 16 m²/g and the firing temperature of 880° C. The firing temperature for the synthesis of the monoclinic $BaSi_2O_5$ was 1200° C.

Example 51

A sintered body of Example 51 was obtained according to the same procedure as Example 2 described above except the use of the monoclinic $BaSi_2O_5$ having the average particle diameter of 1.0 μm and the specific surface area of 4.3 m²/g and the volume ratio of the monoclinic $BaSi_2O_5$ to $Al_2O_3$ set to 80 to 20.

Examples 52 to 54

A sintered body of Example 52 was obtained according to the same procedure as Example 2 described above except addition of 8.0 parts by weight of the glass component as the auxiliary agent and the firing temperature of 910° C. A sintered body of Example 53 was obtained according to the same procedure as Example 2 described above except addition of 10.0 parts by weight of the glass component as the auxiliary agent and the firing temperature of 910° C. A sintered body of Example 54 was obtained according to the same procedure as Example 2 described above except addition of 8.0 parts by weight of the glass component as the auxiliary agent.

Measurement of Density and Open Porosity

Each of the sintered bodies obtained as described above was evaluated for the density and the open porosity. The density and the open porosity were measured by the Archimedes's method in conformity with JIS-R1634 with pure water used as a solvent. The density measured was the bulk density.

Measurement of Bending Strength

Each of the sintered bodies obtained as described above was evaluated for the bending strength. The bending strength was measured by the three-point bending test for each test piece of 1.5×2×20 mm with a strength tester (Universal Test Machine S500C manufactured by Shimadzu Corporation) in conformity with JIS-R1601.

Measurement of Permittivity $\in$ and Q Value

Each of the sintered bodies obtained as described above was evaluated for the permittivity $\in$ and the Q value. The permittivity $\in$ and the Q value were measured for each columnar test piece of 20 mm in diameter×10 mm with an analyzer (8720ES manufactured by Hewlett-Packard Development Company) in conformity with JIS-1627. The Q value was measured at a frequency of 3 GHz.

Measurement of Thermal Expansion Coefficient

Each of the sintered bodies obtained as described above was evaluated for the thermal expansion coefficient. The thermal expansion coefficient was measured for each rectangular test piece of 1.5×2×20 mm with a horizontal dilatometer. The measurement was performed with quartz as the reference substance in a temperature range from 40° C. to 800° C. at a temperature rise rate of 10° C./minute. The thermal expansion coefficient was obtained as a value at the temperature of 800° relative to a value at the temperature of 40° C. as the reference temperature.

X-Ray Diffractometry

Each of the sintered bodies obtained as described above was subject to X-ray diffractometry with a rotating anticathode-type X-ray diffractometer (RINT manufactured by Rigaku Corporation). The conditions of the X-ray diffractometry were CuKα source, 50 kV, 300 mA, and 2θ=10 to 60°). The crystalline phase was identified from the obtained X-ray diffraction spectrum of each sintered body. With regard to the sintered bodies including $Al_2O_3$ and monoclinic $BaSi_2O_5$, a peak intensity ratio of $I_A/I_h$ was calculated from a peak intensity $I_A$ of $Al_2O_3$ at an angle of about 2θ=43° and a peak intensity $I_h$ of the monoclinic $BaSi_2O_5$ at an angle of about 2θ=11° (see FIG. 2). The peak intensity ratio of $I_A/I_h$ conceptually represents a content ratio of alumina to hexagonal celsian, although not strictly.

Elemental Analysis

The elemental analysis was performed by ICP emission spectroscopy.

Electron Microscopy

Each of the sintered bodies obtained as described above was micrographed with a scanning electron microscope (SEM). The cutting plane of each sintered body was observed and micrographed with an SEM (XL30 manufactured by Philips Electronics) under the conditions of an accelerating voltage of 15 kV and a spot size of 4.0.

Measurement Results

Table 1 shows the amounts of the auxiliary additives (% by weight), the average particle diameter (μm), the specific surface area (m²/g), and the additive amount of alumina ($Al_2O_3$), and the firing temperature (° C.), the open porosity (%), the bulk density (g/cm³), the bending strength (MPa), the permittivity ∈, the Q value, the thermal expansion coefficient (1/K), the peak intensity ratio of $I_A/I_h$ in X-ray diffractometry, and the reaction crystalline phase of the sintered body with regard to Examples 1 through 26. Table 2 shows the results of elemental analyses with regard to Examples 1, 6, 10, 11, 14, 15, 17, 24, 25, and 26. Table 3 shows the amounts of the auxiliary additives (% by weight), the average particle diameter (μm), the specific surface area (m²/g), and the additive amount of alumina, and the firing temperature (° C.), the open porosity (%), the bulk density (g/cm³), the bending strength (MPa), the permittivity ∈, the Q value, the thermal expansion coefficient (1/K), the peak intensity ratio of $I_A/I_h$ in X-ray diffractometry, and the reaction crystalline phase of the sintered body with regard to Examples 27 to 36. Table 4 shows the results of elemental analyses with regard to Examples 27 and 32 to 34. The results of Tables 1 through 4 indicate the effects of various combinations of conditions, such as the firing temperature and selection of the glass component, the oxide component, and the alumina. In these tables, each blank space denotes unmeasured and a symbol '-' represents either over a detection limit or unmeasurable.

TABLE 1

| | Material | | | | | Sintered body | | | | | | | | |
|---|---|---|---|---|---|---|---|---|---|---|---|---|---|---|
| | Alumina | | | Amount of the auxiliary additives | | | | | | Permittivity | | | Thermal | Reaction |
| | Particle | Specific | Additive | | | Filing | Open porosity | Bulk | | ∈ | | | expansion | $I_A/$ | crystalline |
| | diameter area μm | surface m²/g | amount % by volume | Glass % by weight | CuO % by weight | temperature ° C. | % by volume | density g/cm³ | Bending strength MPa | coefficient | Q value | 1/K | $L_h$ 1) | line phase |
| Example1 | 4.7 | 1.1 | 15 | 6.0 | 0.5 | 920 | 0.00 | 3.57 | 264 | | | | | h celsian |
| Example2 | 4.7 | 1.1 | 20 | 6.0 | 1.0 | 920 | 0.00 | 3.60 | 313 | 7.6 | 2339 | 11.3 | 0.60 | h celsian |
| Example3 | 4.7 | 1.1 | 20 | 6.0 | 1.5 | 920 | 0.00 | 3.54 | 281 | | | 10.6 | | h celsian |
| Example4 | 4.7 | 1.1 | 25 | 6.0 | 1.5 | 920 | 0.11 | 3.35 | 279 | | | | | h celsian |
| Example5 | 4.7 | 1.1 | 25 | 6.0 | 2.0 | 920 | 0.00 | 3.35 | 269 | | | | | h celsian |
| Example6 | 4.7 | 1.1 | 25 | 6.0 | 3.0 | 920 | 0.11 | 3.34 | 250 | | | | 0.55 | h celsian |
| Example7 | 4.7 | 1.1 | 20 | 6.0 | 1.0 | 880 | 0.06 | 3.57 | 300 | | | | 0.70 | h celsian |
| Example8 | 4.7 | 1.1 | 20 | 4.0 | 1.0 | 920 | 0.00 | 3.46 | 256 | 7.2 | 3982 | | | h celsian |
| Example9 | 4.7 | 1,1 | 20 | 5.0 | 1.0 | 920 | 0.00 | 3.52 | 255 | 7.5 | 3508 | | | h celsian |
| Example10 | 4.7 | 1.1 | 20 | 6.6 | 1.0 | 920 | 0.05 | 3.58 | 263 | 7.8 | 2050 | | | h celsian |
| Example11 | 4.7 | 1.1 | 20 | 2.5 | 1.0 | 960 | 0.00 | 3.62 | 288 | | | | | h celsian |
| Example12 | 4.7 | 1.1 | 20 | 4.0 | 1.0 | 960 | 0.00 | 3.63 | 298 | 7.6 | 3574 | 11.2 | | h celsian |
| Example13 | 4.7 | 1.1 | 20 | 6.0 | 1.0 | 960 | 0.00 | 3.56 | 288 | 7.6 | 2990 | | | h celsian |
| Example14 | 4.7 | 1.1 | 20 | 7.0 | 1.0 | 960 | 0.11 | 3.54 | 263 | 7.5 | 2500 | 11.2 | 0.39 | h celsian |
| Example15 | 4.7 | 1.1 | 10 | 6.0 | 1.0 | 920 | 0.16 | 3.63 | 256 | | | | 0.24 | h celsian |
| Example16 | 4.7 | 1.1 | 15 | 6.0 | 1.0 | 920 | 0.05 | 3.62 | 255 | | | 11.7 | | h celsian |
| Example17 | 4.7 | 1.1 | 25 | 6.0 | 1.0 | 920 | 0.24 | 3.39 | 257 | | | 11.0 | | h celsian |
| Example18 | 0.4 | 6.6 | 15 | 6.0 | 1.0 | 920 | 0.00 | 3.47 | 255 | | | | 0.53 | h celsian |
| Example19 | 1.0 | 3.5 | 15 | 6.0 | 1.0 | 920 | 0.05 | 3.51 | 260 | | | | | h celsian |
| Example20 | 2.6 | 3.3 | 20 | 6.0 | 1.0 | 920 | 0.05 | 3.45 | 264 | | | | | h celsian |
| Example21 | 6.7 | 0.9 | 20 | 6.0 | 1.0 | 920 | 0.00 | 3.55 | 304 | | | | | h celsian |
| Example22 | 4.7 | 1.1 | 20 | 6.0 | MgO 1.0 | 960 | 0.16 | 3.56 | 268 | 7.5 | 2189 | | 0.55 | h celsian |
| Example23 | 4.7 | 1.1 | 20 | 6.0 | $B_2O_3$ 1.0 | 960 | 0.00 | 3.53 | 286 | 7.3 | 3108 | | 0.37 | h celsian |
| Example24 | 4.7 | 1.1 | 20 | 6.0 | ZnO 1.0 | 960 | 0.16 | 3.60 | 303 | 7.5 | 2468 | | 0.67 | h celsian |
| Example25 | 4.7 | 1.1 | 20 | 6.0 | $Bi_2O_3$ 1.0 | 960 | 0.25 | 3.51 | 250 | | | | | h celsian |
| Example26 | 4.7 | 1.1 | 20 | 6.0 | $ZrO_2$ 1.0 | 960 | 0.16 | 3.42 | 269 | 7.0 | 2926 | | 0.72 | h celsian |

1) peak intensity ratio of $I_A/I_h$: a peak intensity ratio of a peak intensity $I_A$ of $Al_2O_3$ and a peak intensity $I_h$ of the monoclinic $BaSi_2O_5$ in X-ray diffractometry
2) h celsian: hexagonal celsian

TABLE 2

| | BaO % by weight | $SiO_2$ % by weight | $Al_2O_3$ % by weight | $B_2O_3$ % by weight | SrO % by weight | CuO % by weight | $ZrO_2$ % by weight | ZnO % by weight | $Bi_2O_3$ % by weight |
|---|---|---|---|---|---|---|---|---|---|
| Example1 | 45.66 | 36.64 | 15.58 | 1.63 | 0.01 | 0.47 | — | — | — |
| Example6 | 39.03 | 31.57 | 24.75 | 1.89 | 0.01 | 2.75 | — | — | — |
| Example10 | 43.52 | 34.29 | 20.87 | 0.34 | 0.00 | 0.98 | — | — | — |

TABLE 2-continued

|  | BaO % by weight | SiO$_2$ % by weight | Al$_2$O$_3$ % by weight | B$_2$O$_3$ % by weight | SrO % by weight | CuO % by weight | ZrO$_2$ % by weight | ZnO % by weight | Bi$_2$O$_3$ % by weight |
|---|---|---|---|---|---|---|---|---|---|
| Example11 | 43.20 | 34.29 | 20.71 | 0.83 | 0.00 | 0.97 | — | — | — |
| Example14 | 42.28 | 34.29 | 20.25 | 2.23 | 0.01 | 0.93 | — | — | — |
| Example15 | 47.99 | 38.61 | 10.52 | 1.93 | 0.01 | 0.93 | — | — | — |
| Example17 | 39.75 | 32.16 | 25.21 | 1.93 | 0.01 | 0.93 | — | — | — |
| Example24 | 42.48 | 34.29 | 20.35 | 1.93 | 0.01 | — | — | 0.93 | — |
| Example25 | 42.48 | 34.29 | 20.35 | 1.93 | 0.01 | — | — | — | 0.93 |
| Example26 | 42.48 | 34.29 | 20.35 | 1.93 | 0.01 | — | 0.93 | — | — |

TABLE 3

| | Material | | | Amount of the auxiliary additives | |
|---|---|---|---|---|---|
| | Alumina | | | | |
| | Particle diameter μm | Specific surface area m$^2$/g | Additive amount % by volume | Glass % by weight | CuO % by weight |
| Example27 | 4.7 | 1.1 | 20 | 6.0 | 0.0 |
| Example28 | 4.7 | 1.1 | 20 | 6.0 | 0.0 |
| Example29 | 4.7 | 1.1 | 20 | 0.0 | 1.0 |
| Example30 | 4.7 | 1.1 | 20 | 1.0 | 1.0 |
| Example31 | 4.7 | 1.1 | 20 | 10.0 | 1.0 |
| Example32 | — | — | 0 | 6.0 | 1.0 |
| Example33 | | | 5 | 6.0 | 1.0 |
| Example34 | 4.7 | 1.1 | 30 | 6.0 | 1.0 |
| Example35 | 0.5 | 48.0 | 20 | 6.0 | 1.0 |
| Example36 | 4.7 | 1.1 | 20 | 6.0 | TiO$_2$ 1.0 |

| | Sintered body | | | | | | | |
|---|---|---|---|---|---|---|---|---|
| | Firing temperature °C. | Open porosity % by volume | Bulk density g/cm$^3$ | Bending strength MPa | Permittivity ε | Q value | Thermal expansion coefficient 1/K | $I_A/I_h$ [1] | Reaction crystalline phase [2] |
| Example27 | 1100 | 19.84 | 2.96 | | | | | | h celsian |
| Example28 | 1300 | 0.33 | 3.25 | | | | 9.1 | 0.17 | h celsian |
| Example29 | 920 | 32.44 | 2.53 | | | | | | h celsian |
| Example30 | 920 | 25.94 | 2.80 | | | | | | h celsian |
| Example31 | 920 | 0.00 | 3.60 | 250 | | 1000 | | 0.10 | h celsian |
| Example32 | 920 | 0.32 | 3.67 | 220 | 7.3 | 4208 | | 0.00 | None |
| Example33 | 920 | 0.16 | 3.65 | 230 | | | | 0.12 | h celsian |
| Example34 | 920 | 6.93 | 3.20 | | | | | | h celsian |
| Example35 | 920 | 16.69 | 2.80 | | | | | 0.00 | h celsian |
| Example36 | 960 | 0.08 | 3.56 | 278 | 7.2 | 1695 | | 0.71 | h celsian |

[1] peak intensity ratio of $I_A/I_h$: a peak intensity ratio of a peak intensity $I_A$ of Al$_2$O$_3$ and a peak intensity $I_h$ of the monoclinic BaSi$_2$O$_5$ in X-ray diffractometry
[2] h celsian: hexagonal celsian

TABLE 4

|  | BaO % by weight | SiO$_2$ % by weight | Al$_2$O$_3$ % by weight | B$_2$O$_3$ % by weight | SrO % by weight | CuO % by weight | ZrO$_2$ % by weight | ZnO % by weight | Bi$_2$O$_3$ % by weight |
|---|---|---|---|---|---|---|---|---|---|
| Example27 | 42.88 | 34.61 | 20.54 | 1.95 | 0.01 | 0.00 | — | — | — |
| Example32 | 53.58 | 43.00 | 0.54 | 1.93 | 0.01 | 0.93 | — | — | — |
| Example33 | 50.77 | 40.79 | 5.55 | 1.93 | 0.01 | 0.93 | — | — | — |
| Example34 | 37.05 | 30.04 | 30.03 | 1.93 | 0.01 | 0.93 | — | — | — |

According to the results of Tables 1 through 4, the monoclinic BaSi$_2$O$_5$ was suitable as the material for producing the hexagonal celsian. The preferable average particle diameter and the preferable specific surface area of the Al$_2$O$_3$ reinforcement particles were respectively in a range of 0.4 μm to 6.7 μm and in a range of 0.9 m$^2$/g to 6.6 m$^2$/g. The preferable volume ratio of Al$_2$O$_3$ to BaSi$_2$O$_5$ was in a range of 15% by volume to 25% by volume. The preferable content of the glass component used as the auxiliary additive to the total weight including BaSi$_2$O$_5$ and Al$_2$O$_3$ was in a range of 2.5% by weight to 7% by weight. An oxide of at least one selected from the group consisting of Cu, Mg, B, Zn, Bi, and Zr was preferably used as the additive oxide. The preferable content of CuO as the additive oxide was in a range of 0.5% by weight to 3% by weight. When these conditions were satisfied, the firing temperature of not higher than 960° C. or more specifically even not higher than 920° C. gave sintered bodies having the high strength of not lower than 250 MPa and the high Q value of or above 2000. As shown in Table 2, all the sintered ceramic bodies subject to the elemental analyses had the Sr content of not higher than 0.01% by weight in oxide conversion. The less content of Sr may lead to the higher productivity of the hexagonal celsian.

Table 5 shows the measurement results of Examples 20, 37, and 38. The results of Table 5 indicate the effects of the crystalline phase of the material $BaSi_2O_5$. As shown in the results of Tables 1 and 5, the use of the monoclinic $BaSi_2O_5$ gave sintered bodies having the high strength and the high Q value even at the firing temperature of not higher than 960° C. Addition of $Bi_2O_5$ or ZnO as the auxiliary additive for the synthesis of $BaSi_2O_5$ gave the orthorhombic $BaSi_2O_5$. No addition of $Bi_2O_5$ or ZnO as the auxiliary additive for the synthesis of $BaSi_2O_5$, on the other hand, gave the monoclinic $BaSi_2O_5$. The sintered body prepared from the orthorhombic $BaSi_2O_5$ undesirably included the monoclinic celsian.

TABLE 5

| | Material | | | | | | | |
|---|---|---|---|---|---|---|---|---|
| | BS Synthetic powder | | | Amount of the auxiliary additives | | | Alumina | |
| | Synthetic temperature ° C. | $Bi_2O_3$ % by weight | ZnO % by weight | BS crystalline phase | Glass % by weight | CuO % by weight | Particle diameter μm | Specific surface area $m^2/g$ | Additive amount % by volume |
| Example20 | 1200 | <0.01 | <0.01 | Monoclinic | 6.0 | 1.0 | 2.6 | 3.3 | 20 |
| Example37 | 900 | 3.2 | 4 | Orthorhombic | 6.0 | 1.0 | 2.6 | 3.3 | 10 |
| Example38 | 900 | 3.2 | 4 | Orthorhombic | 6.0 | 1.0 | 2.6 | 3.3 | 10 |

| | Sintered body | | | | |
|---|---|---|---|---|---|
| | Firing temperature ° C. | Open porosity % by volume | Bulk density $g/cm^3$ | Bending strength MPa | BS crystalline phase | Reaction crystalline phase |
| Example20 | 920 | 0.05 | 3.45 | 264 | Orthorhombic | h celsian |
| Example37 | 920 | 19.37 | 2.86 | — | Orthorhombic | m celsian |
| Example38 | 1000 | 0.38 | 3.53 | 148 | Orthorhombic | m celsian |

※ h celsian: hexagonal celsian, m celsian: monoclinic celsian

Table 6 shows the measurement results of Examples 16 and 39 to 42. The results of Table 6 indicate the effects of various glass components used as the auxiliary additive. As shown in the results of Table 6, the Ba—Si—B—O glass was more suitable as the glass component than the Mg—Ba—Si—B—O glass, the Ba—Si—O glass, and the Na—Si—Zn—O glass.

TABLE 6

| | Material | | | | | | | | | |
|---|---|---|---|---|---|---|---|---|---|---|
| | Glass composition/% by weight | | | | | | | Amount of the auxiliary additives | | Alumina Additive |
| | $SiO_2$ | BaO | $B_2O_3$ | $Al_2O_3$ | MgO | ZnO | $Na_2O$ | Glass % by weight | CuO % by weight | amount % by volume |
| Example16 | 34.44 | 21.35 | 34.50 | 9.71 | — | — | — | 6.0 | 1.0 | 15 |
| Example39 | 14.00 | 12.00 | 25.00 | 2.00 | 47.00 | — | — | 6.0 | 1.0 | 15 |
| Example40 | 45.00 | 51.60 | — | 3.40 | — | — | — | 6.0 | 1.0 | 15 |
| Example41 | 16.40 | 83.60 | — | — | — | — | — | 6.0 | 1.0 | 15 |
| Example42 | 40.00 | — | — | — | — | 40.00 | 0.00 | 6.0 | 1.0 | 15 |

| | Sintered body | | | | |
|---|---|---|---|---|---|
| | Firing temperature ° C. | Open porosity % by volume | Bulk density $g/cm^3$ | Bending strength MPa | BS crystalline phase | Reaction crystalline phase |
| Example16 | 920 | 0.05 | 3.62 | 255 | Orthorhombic | h celsian |
| Example39 | 920 | 1.88 | 3.33 | 190 | — | — |
| Example40 | 920 | 42.0 | 2.01 | — | — | — |
| Example41 | 920 | 41.0 | 2.05 | — | — | — |
| Example42 | 920 | 40.0 | 1.95 | — | — | — |

Figure 2:
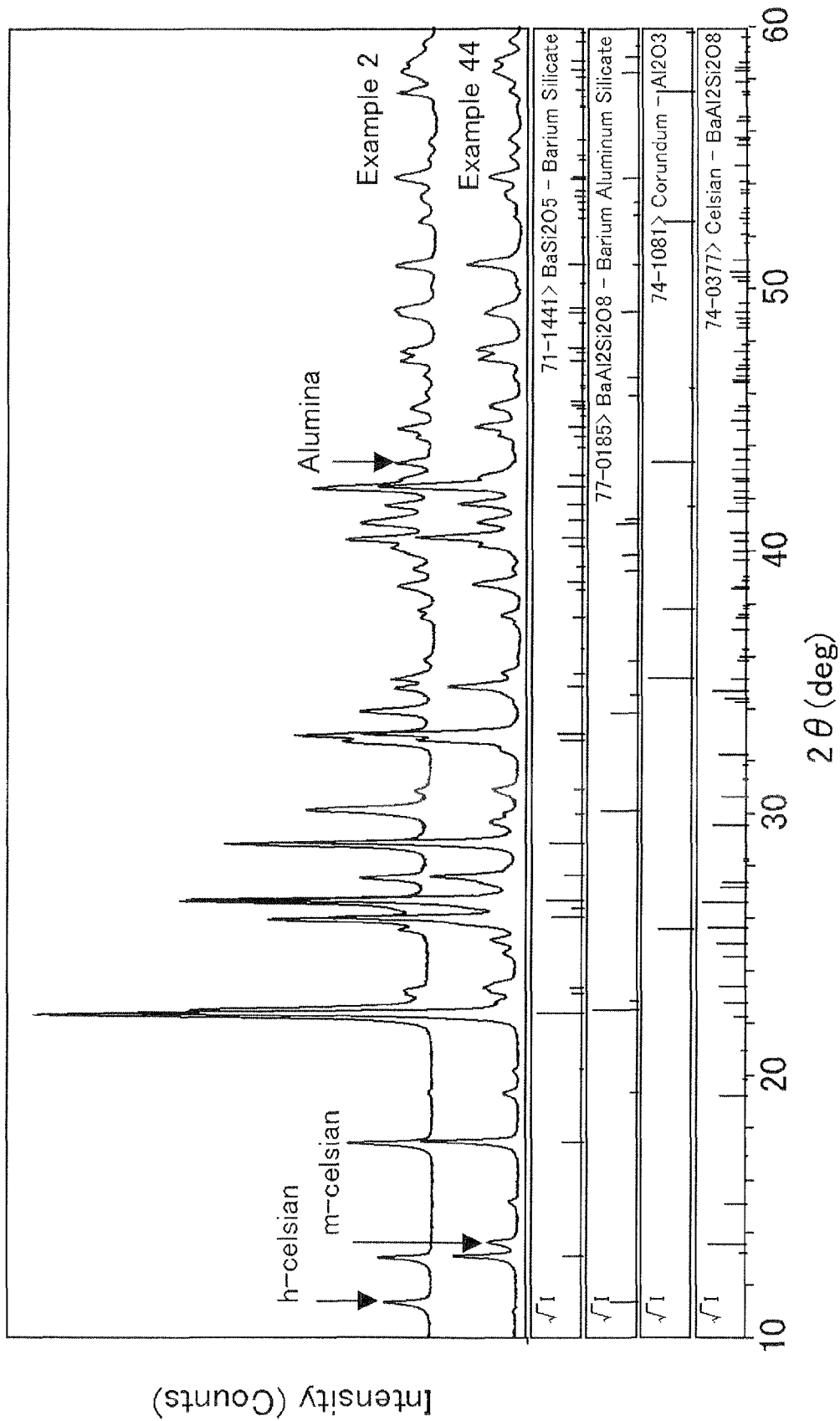
FIG. 2 is X-ray diffraction measurement results of Examples 2 and 44.

Table 7 shows the measurement results of Examples 2, 38, 43, and 44. FIG. 1 shows scanning electron micrographs of Examples 2, 38, 43, and 44. FIG. 2 shows results of X-ray diffractometry of Examples 2 and 44. These results of Table 7 and FIGS. 1 and 2 indicate the effects the crystalline phase of the celsian included in the sintered body and the fine structure of the sintered body. As shown in the results of Table 7, the sintered body having some content of $Al_2O_3$ but including the monoclinic celsian (Example 38), the sintered body including the hexagonal celsian but having no content of $Al_2O_3$ (Example 43), and the sintered body including not the hexagonal celsian but the monoclinic celsian and having no content of $Al_2O_3$ (Example 44) had only the insufficient strengths. FIG. 1 clearly shows production of celsian through the reaction of $Al_2O_3$ particles with $BaSi2O5$. In the presence of the remaining $Al_2O_3$ particles, the celsian was produced to cover over the outer circumferences of the remaining $Al_2O_3$ particles. According to FIG. 1 and Table 7, the fine structure with the hexagonal celsian present on the outer circumferences of the $Al_2O_3$ particles or more specifically the fine structure with the hexagonal celsian present to cover over the outer circumferences of the $Al_2O_3$ particles gave sintered bodies having the high strength of not lower than 250 MPa and the high Q value of or above 2000 even at the firing temperature of 920° C.

TABLE 7

| | Material | | | | |
|---|---|---|---|---|---|
| | Amount of the auxiliary additives | | Alumina | | |
| | Glass % by weight | CuO % by weight | Particle diameter μm | Specific surface area m²/g | Additive amount % by volume |
| Example2 | 6.0 | 1.0 | 4.7 | 1.1 | 20 |
| Example38 | 6.0 | 1.0 | 2.6 | 3.3 | 10 |
| Example43 | 6.0 | 1.0 | — | — | 0 |
| Example44 | 6.0 | 1.0 | — | — | 0 |

| | Sintered body | | | | | |
|---|---|---|---|---|---|---|
| | Firing temperature ° C. | Open porosity % by volume | Bulk density g/cm³ | Bending strength MPa | Permittivity ε | Q value | Reaction crystalline phase |
| Example2 | 920 | 0.00 | 3.60 | 313 | 7.62 | 2339 | h celsian |
| Example38 | 1000 | 0.38 | 3.53 | 148 | | | m celsian |
| Example43 | 920 | 0.03 | 3.39 | 225 | | | h celsian |
| Example44 | 920 | 0.11 | 3.63 | 216 | 7.30 | 4014 | m celsian |

※h celsian: hexagonal celsian, m celsian: monoclinic celsian

Table 8 shows the measurement results of Examples 15 and 45 to 49. The results of Table 8 indicate the effects of various reinforcement particles. As shown in the results of Table 8, $Al_2O_3$ was the most effective reinforcement particles for enhancing the strength.

TABLE 8

| | Material | | | | Thermal | Additive |
|---|---|---|---|---|---|---|
| | Amount of the auxiliary additives | | | | | |
| | Firing temperature ° C. | Glass % by weight | CuO % by weight | Reinforcement particle | expansion coefficient 1/K | amount % by volume |
| Example15 | 920 | 6.0 | 1.0 | $Al_2O_3$ | 9.0 | 10 |
| Example45 | 920 | 6.0 | 1.0 | $MgAl_2O_4$ | 7.5 | 10 |
| Example46 | 920 | 6.0 | 1.0 | $2Al_2O_3 \cdot SiO_2$ | 6.0 | 10 |
| Example47 | 920 | 6.0 | 1.0 | $2MgO \cdot 5SiO_2 \cdot 2Al_2O_3$ | 3.0 | 10 |
| Example48 | 920 | 6.0 | 1.0 | $ZrO_2$ | 10.3 | 10 |
| Example49 | 920 | 6.0 | 1.0 | MgO | 13.5 | 10 |

| | Sintered body | | | |
|---|---|---|---|---|
| | Firing temperature ° C. | Open porosity % by volume | Bulk density g/cm³ | Bending strength MPa |
| Example15 | 920 | 0.16 | 3.63 | 256 |
| Example45 | 920 | 0.50 | 3.58 | 200 |
| Example46 | 920 | 0.19 | 3.58 | 200 |

TABLE 8-continued

| | | | | |
|---|---|---|---|---|
| Example47 | 920 | 0.38 | 3.58 | 190 |
| Example48 | 920 | meltdown | | |
| Example49 | 920 | 0.00 | 3.58 | 180 |

Table 9 shows the measurement results of Examples 2, 50, and 51. The results of Table 9 indicate the effects of the average particle diameter and the specific surface area of the material $BaSi_2O_5$. As shown in the results of Table 9, the preferable average particle diameter and the preferable specific surface area of $BaSi_2O_5$ were respectively in a range of 0.3 μm to 0.5 μm and in a range of 10 m²/g to 16 m²/g.

Table 10 shows the measurement results of Examples 52 to 54. The results of Table 10 indicate the effects of increasing the content of the glass component as the auxiliary additive and of lowering the firing temperature. As shown in the results of Table 10, the sintered bodies of Examples 52 and 53 prepared under the conditions of the increased content of the glass component as the auxiliary additive and the lowered firing temperature had the sufficient strengths. The increased content of the glass component led to a decreasing tendency of the Q value.

TABLE 9

| | Material | | | | | | |
|---|---|---|---|---|---|---|---|
| | BS Synthetic powder | | | Amount of the auxiliary additives | | Alumina | |
| | Synthetic temperature °C. | Particle diameter μm | Specific surface area m²/g | Glass % by weight | CuO % by weight | Particle diameter μm | Specific surface area m²/g | Additive amount % by volume |
| Example2 | 1200 | 0.5 | 10 | 6.0 | 1.0 | 4.7 | 1.1 | 20 |
| Example50 | 1200 | 0.3 | 16 | 6.0 | 1.0 | 4.7 | 1.1 | 10 |
| Example51 | 1200 | 1 | 4.3 | 6.0 | 1.0 | 4.7 | 1.1 | 20 |

| | Sintered body | | | | | |
|---|---|---|---|---|---|---|
| | Firing temperature °C. | Open porosity % by volume | Bulk density g/cm³ | Bending strength MPa | BS crystalline phase | Reaction crystalline phase |
| Example2 | 920 | 0.00 | 3.60 | 313 | Orthorhombic | h celsian |
| Example50 | 880 | 0.12 | 3.55 | 300 | Orthorhombic | h celsian |
| Example51 | 920 | 6.93 | 3.20 | — | Orthorhombic | h celsian |

TABLE 10

| | Material | | | | |
|---|---|---|---|---|---|
| | Amount of the auxiliary additives | | Alumina | | |
| | Glass % by weight | CuO % by weight | Particle diameter μm | Specific surface area m²/g | Additive amount % by volume |
| Example52 | 8.0 | 1.0 | 4.7 | 1.1 | 20 |
| Example53 | 10.0 | 1.0 | 4.7 | 1.1 | 20 |
| Example54 | 8.0 | 1.0 | 4.7 | 1.1 | 20 |

| | Sintered body | | | | | | | |
|---|---|---|---|---|---|---|---|---|
| | BaO % by weight | SiO₂ % by weight | Al₂O₃ % by weight | B₂O₃ % by weight | SrO % by weight | CuO % by weight | ZrO₂ % by weight | ZnO % by weight | Bi₂O₃ % by weight |
| Example52 | 53.54 | 22.87 | 20.16 | 2.54 | 0.01 | 0.90 | — | — | — |
| Example53 | 52.94 | 23.08 | 19.97 | 0.34 | 0.00 | 0.90 | — | — | — |
| Example54 | | | | | | | | | |

TABLE 10-continued

| | Sintered body | | | | | | | |
|---|---|---|---|---|---|---|---|---|
| | Firing temperature °C. | Open porosity % by volume | Bulk density g/cm³ | Bending strength MPa | Permittivity ε | Q value | $I_A/I_h$ [1] | Reaction crystalline phase [2] |
| Example52 | 910 | 0.24 | 3.55 | 250 | | 2000 | 0.42 | h celsian |
| Example53 | 910 | 0.00 | 3.55 | 260 | | 1100 | 0.40 | h celsian |
| Example54 | 920 | 0.00 | 3.56 | 250 | 7.00 | | 0.47 | h celsian |

[1] peak intensity ratio of $I_A/I_h$: a peak intensity ratio of a peak intensity $I_A$ of $Al_2O_3$ and a peak intensity $I_h$ of the monoclinic $BaSi_2O_2$ in X-ray diffractometry
[2] h celsian: hexagonal celsian Layered structures of the sintered ceramic body according to the invention and a different dielectric material were produced. For the purpose of enhancing the bonding property between the sintered ceramic body and the different dielectric material, a middle layer was formed between the sintered ceramic body and the different dielectric material in some layered structures. For the same purpose, the amounts of auxiliary additives mixed with the different dielectric material were regulated in other layered structures.

Preparation of Different Dielectric Material ($BaTiO_3$)

$BaTiO_3$ powder was mixed with 2 to 6% by weight of commercially available ZnO—$B_2O_3$—$SiO_2$ glass (ASF1939 manufactured by Asahi Glass Co., Ltd), was wet crushed in a solvent IPA with a ball mill of $ZrO_2$ cobbles of 2 mm in diameter for 12 hours, and was dried to give the powder of a different dielectric material.

Preparation of Powder Material of Middle Layer

A mixture of 88 Parts by weight of $BaSi_2O_5$ powder, 9 parts by weight of the m-celsian, and 3 parts by weight of commercially available BaO—$B_2O_3$—$SiO_2$ glass (ASF1780 manufactured by Asahi Glass Co., Ltd) according to a desired composition was crushed in a solvent IPA with a ball mill of $ZrO_2$ cobbles of 2 mm in diameter and was dried in a nitrogen atmosphere at a temperature of 110° C. for 16 hours to give the powder material of a middle layer.

Production of Layered Structures with Middle Layer

Examples 55 to 61

45 Parts by weight of the powder material of the middle layer thus obtained was mixed with 8 parts by weight of an organic binder, 2 parts by weight of a plasticizer, 1 part by weight of a dispersant, and 44 parts by weight of an organic solvent with a ball mill for 10 hours to obtain the slurry of the middle layer. The slurry was processed to middle layer tapes of 0.02 to 0.1 mm in thickness by the doctor blade method. One or two middle layer tapes were laid on 20 plies of sintered ceramic body tapes. Alternatively the slurry of the middle layer may be printed on the 20 pies of sintered ceramic body tapes. Subsequently 20 plies of different dielectric material tapes were laid above the middle layer to complete a layered structure. Each of the layered structures thus obtained was fired in the atmosphere at a temperature of 910 to 930° C. The thickness of the sintered ceramic body layer was 0.6 mm, and the thickness of the different dielectric material layer was also 0.6 mm. The layered structures of Examples 55 to 61 respectively had the thickness of the middle layer set to 0 µm, 0.5 µm, 1.5 µm, 3.0 µm, 5.0 µm, 10.0 µm, and 30.0 µm.

Production of Layered Structures with Regulation of Additive Contents

Examples 62 to 65

The powder material of the different dielectric material prepared as described above was charged into a die of 3×4×40 mm and was molded under a pressure of 76 kg/cm² to a dielectric layer. The powder material of the sintered ceramic body was then charged above the dielectric layer in the die and was molded under a pressure of 76 kg/cm² to a layered structure. The layered structure was then subjected to CIP treatment under a pressure of 3000 kg/cm² and was fired in the atmosphere at a temperature of 910 to 930° C. The layered structures of Examples 62 to 65 were produced by mixing the glass component and the other additives according to the compositions shown in Table 12. Example 62 had the composition containing 1.5% by weight of ZnO, while Examples 63 to 65 had the compositions with no content of ZnO.

Electron Microscopy

Figure 3:
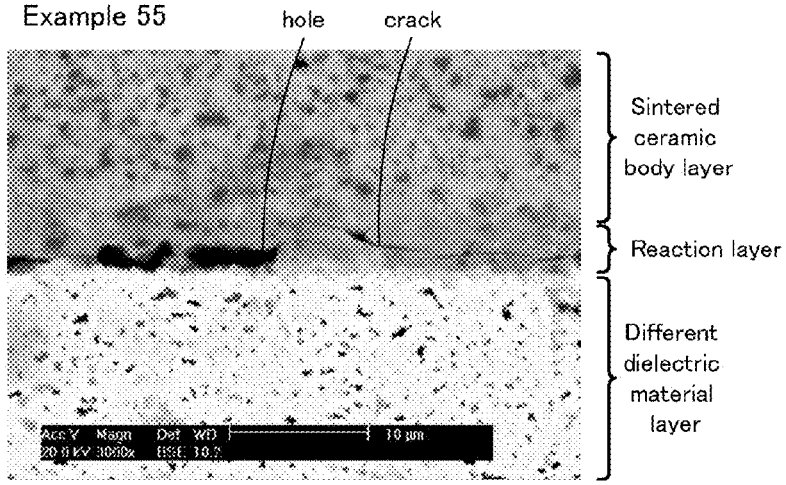
FIG. 3 is scanning electron micrographs of cross sections of laminates of Examples 55, 60, and 63.
Figure 3:
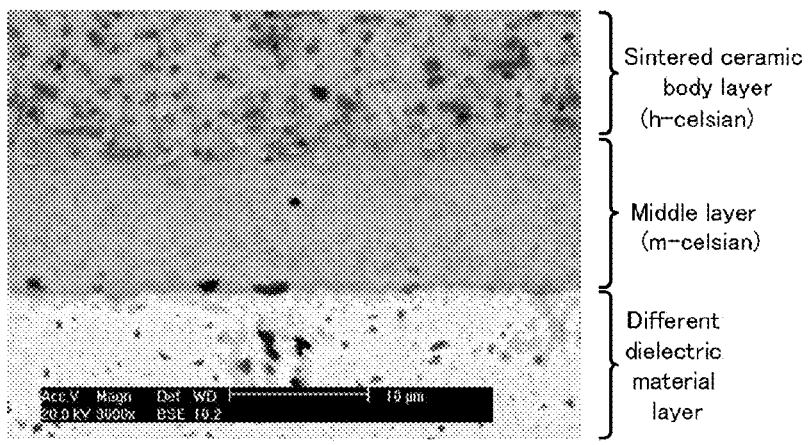
Figure 3:
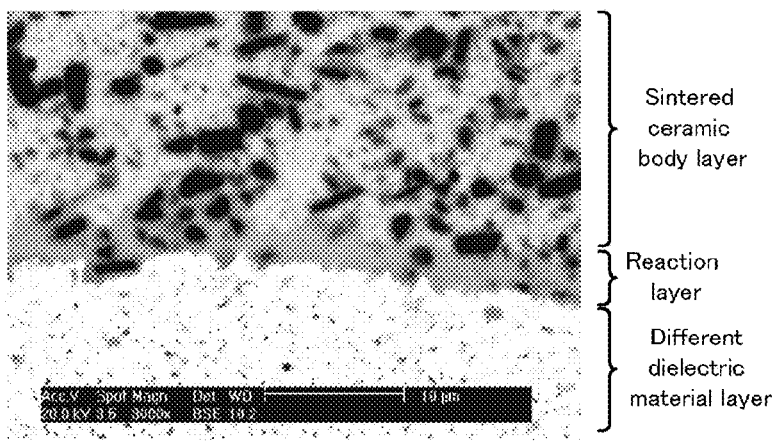

Each of the layered structures produced as described above was micrographed for evaluation with a scanning electron microscope (SEM). The reflected electron image on the cutting plane of each layered structure was observed and micrographed with an SEM (XL30 manufactured by Philips Electronics). The thickness of a reaction layer produced at an interface between the sintered ceramic body and the different dielectric material during firing was given as an average of five measurement points at equal intervals in the reaction layer observed by a scanning electron micrograph (×3000). FIG. 3 shows scanning electron micrographs of the cutting planes of the layered structures of Examples 55, 60, and 63.

Measurement Results

Table 11 shows the evaluation results of the layered structures of Examples 55 to 61 for the permittivity ∈ of the layered structure, the thickness of the middle layer (µm), the thickness of the reaction layer (µm), the presence of cracks, the presence of holes, and the bonding status. In the layered structure of Example 55 having the sintered ceramic body of the invention directly bonded to the different dielectric material including the ZnO-containing additive, relatively large holes or cracks were undesirably generated in the reaction layer produced at the interface between the different dielectric material layer and the sintered ceramic body layer. The detailed analysis of the reaction layer indicated significant inclusion of the m-celsian in the reaction layer. The presence of Zn may cause a phase change from the h-celsian to the m-celsian during firing and thereby a volume change, leading to the generation of holes or cracks. A medium layer with material preventing a phase change even in the presence of a specific element of accelerating the phase change was accordingly formed between the different dielectric material layer and the sintered ceramic body layer. The m-celsian as the product of the phase change was used as the material of the medium layer. According to the evaluation results of Table 11, the middle layer having the thickness of not greater than 1.5 µm caused a reaction layer having a significant thickness and thus failed to prevent the generation of cracks or holes. The middle layer having the thickness of greater than 1.5 µm or more specifically not less than 3.0 µm significantly decreased the thickness of the reaction layer and thus effectively prevented the generation of cracks or holes to give the desirable bonding status. The middle layer functioning as a barrier may effectively prevent diffusion of the glass component of the different dielectric material and thereby prevent a variation in permittivity of the different dielectric material. The preferable thickness of the middle layer may be greater than 1.5 μm and not greater than 40 μm. Formation of such a middle layer may be effective for various elements other than Zn accelerating the phase change of the celsian.

TABLE 11

Layered structure (with Mddle layer)

| | Permittivity ε | Mddle layer thickness μm | Reaction layer thickness μm | Cracks | Holes | Bonding state |
|---|---|---|---|---|---|---|
| Example55 | | 0 | 8.0 | YES | YES | undesirable |
| Example56 | | 0.5 | 5.7 | YES | YES | undesirable |
| Example57 | | 1.5 | 4.1 | YES | YES | undesirable |
| Example58 | | 3.0 | 2.1 | NO | NO | desirable |
| Example59 | | 5.0 | 0.9 | NO | NO | desirable |
| Example60 | 83 | 10.0 | None | NO | NO | desirable |
| Example61 | | 30.0 | None | NO | NO | desirable |

Table 12 shows the evaluation results of the layered structures of Examples 62 to 65 having the specified content of the different dielectric material (BaTiO₃ material) and the specified contents (% by weight) of Bi, Zn, Ba, Si, and Al in oxide conversion for the thickness of the reaction layer (μm), the presence of cracks, the presence of holes, and the bonding status. The results of Table 12 indicate the effects of the reduced content of the specific element of accelerating the phase change included in the different dielectric material. In the layered structure of Example 62 having the sintered ceramic body of the invention directly bonded to the different dielectric material including the Zn-containing additive, relatively large holes or cracks were undesirably generated in the reaction layer produced at the interface between the different dielectric material layer and the sintered ceramic body layer. Using the different dielectric layer with the reduced content or no content of Zn, on the other hand, significantly decreased the thickness of the reaction layer and thus effectively prevented the generation of cracks or holes to give the desirable bonding status. As shown in Table 12, the content of ZnO of less than 1.5% by weight significantly decreased the thickness of the reaction layer and thus effectively prevented the generation of cracks or holes to give the desirable bonding status.

What is claimed:

1. A manufacturing method of a sintered ceramic body, comprising:
   a material mixing step of mixing barium silicate with aluminum oxide, a predetermined glass material, and a predetermined additive oxide under adoption of conditions (1) and (2) to prepare a material mixture; and
   a firing step of molding the material mixture to a molded object and firing the molded object at a temperature in a range of not lower than 850° C. and not higher than 1000° C.,
   wherein the condition (1) is that the barium silicate is monoclinic and has an average particle diameter in a range of not less than 0.3 μm and less than 1 μm and a specific surface area in a range of not less than 5 m²/g and not greater than 20 m²/g; and
   the condition (2) is that the aluminum oxide has an average particle diameter in a range of not less than 0.4 μm and not greater than 10 μm, a specific surface area in a range of not less than 0.8 m²/g and not greater than 8 m²/g, and a volume ratio of the aluminum oxide to the barium silicate in a range of not less than 10% by volume and not greater than 25% by volume.

2. The manufacturing method of a sintered ceramic body in accordance with claim 1, wherein the material mixing step further adopts a condition (3) to prepare the material mixture,
   wherein the condition (3) is that the predetermined glass material is Ba—Si—B—O glass and has a content in a range of not less than 2% by weight and not greater than 10% by weight relative to a total weight including the barium silicate and the aluminum oxide.

3. The manufacturing method of a sintered ceramic body in accordance with claim 1, wherein the material mixing step further adopts a condition (4) to prepare the material mixture,
   wherein the condition (4) is that the predetermined additive oxide is an oxide of at least one selected from the group consisting of Cu, Mg, B, Zn, Bi, and Zr and has a content

TABLE 12

Layered structure (Element content adjusted)

| | different dielectric material/% by weight | | | | | | Reaction layer Thickness | Bonding | | |
|---|---|---|---|---|---|---|---|---|---|---|
| | BaTiO₃ | BiO₂ | ZnO | B₂O₃ | SiO₂ | Al₂O₃ | μm | Cracks | Holes | state |
| Example62 | 92.7 | 4.9 | 1.5 | 0.7 | 0.2 | — | 8.0 | YES | YES | undesirable |
| Example63 | 92.5 | 4.7 | 0.0 | 0.9 | 1.4 | 0.5 | 2.0 | NO | NO | desirable |
| Example64 | 91.9 | 4.7 | 0.0 | 1.1 | 1.7 | 0.6 | | NO | NO | desirable |
| Example65 | 91.5 | 4.8 | 0.0 | 1.6 | 1.6 | 0.5 | | NO | NO | desiranle | in a range of not less than 0.5% by weight and not greater than 3% by weight relative to a total weight including the barium silicate and the aluminum oxide.

4. The manufacturing method of a sintered ceramic body in accordance with claim 1, wherein the firing step fires the molded object at a temperature of not higher than 960° C.

5. The manufacturing method of a sintered ceramic body in accordance with claim 1, further comprising:
   before the material mixing step, a material preparation step of mixing a barium compound with a silicon compound and firing the mixed barium compound and silicon compound without addition of Bi and Zn to prepare monoclinic barium silicate.

6. The manufacturing method of a sintered ceramic body in accordance with claim 1, wherein the material mixing step prepares the material mixture so that a Sr content in oxide conversion in the sintered ceramic body is not greater than 0.5% by weight.

\* \* \* \* \*